US008850194B2

(12) United States Patent
Metke et al.

(10) Patent No.: US 8,850,194 B2
(45) Date of Patent: Sep. 30, 2014

(54) SYSTEM AND METHODS FOR PROVIDING MULTI-HOP ACCESS IN A COMMUNICATIONS NETWORK

(75) Inventors: Anthony R. Metke, Naperville, IL (US); Robert D. LoGalbo, Rolling Meadows, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1926 days.

(21) Appl. No.: 11/108,999

(22) Filed: Apr. 19, 2005

(65) Prior Publication Data

US 2006/0236377 A1    Oct. 19, 2006

(51) Int. Cl.
| | |
|---|---|
| *H04L 29/06* | (2006.01) |
| *H04W 12/06* | (2009.01) |
| *H04W 40/22* | (2009.01) |
| *H04W 84/22* | (2009.01) |
| *H04W 88/04* | (2009.01) |

(52) U.S. Cl.
CPC ........... *H04L 63/162* (2013.01); *H04W 12/06* (2013.01); *H04L 63/0892* (2013.01); *H04L 63/08* (2013.01); *H04W 40/22* (2013.01); *H04W 84/22* (2013.01); *H04W 88/04* (2013.01)
USPC ................ 713/168; 380/270; 726/4

(58) Field of Classification Search
USPC ................ 726/4; 713/168; 380/270
See application file for complete search history.

(56) References Cited

U.S. PATENT DOCUMENTS

| | | | | |
|---|---|---|---|---|
| 6,856,800 | B1 * | 2/2005 | Henry et al. ............... | 455/411 |
| 6,879,574 | B2 * | 4/2005 | Naghian et al. ............ | 370/338 |
| 7,075,912 | B2 * | 7/2006 | Suda et al. ................. | 370/331 |
| 7,174,456 | B1 * | 2/2007 | Henry et al. ............... | 713/158 |
| 2003/0012163 | A1 * | 1/2003 | Cafarelli et al. ........... | 370/338 |
| 2004/0103275 | A1 * | 5/2004 | Ji et al. ...................... | 713/150 |
| 2004/0103282 | A1 * | 5/2004 | Meier et al. ................ | 713/171 |
| 2004/0105414 | A1 * | 6/2004 | Narayanan et al. ........ | 370/338 |
| 2004/0208156 | A1 * | 10/2004 | Chu et al. ................... | 370/338 |
| 2004/0240412 | A1 * | 12/2004 | Winget ....................... | 370/331 |
| 2005/0144474 | A1 * | 6/2005 | Takala et al. ............... | 713/200 |
| 2005/0152305 | A1 * | 7/2005 | Ji et al. ...................... | 370/328 |
| 2006/0126845 | A1 * | 6/2006 | Zheng ........................ | 380/270 |
| 2007/0184837 | A1 * | 8/2007 | Hohl et al. ............. | 455/435.1 |
| 2008/0069105 | A1 * | 3/2008 | Costa et al. ................ | 370/392 |

FOREIGN PATENT DOCUMENTS

WO    WO 2005011192 A1 *   2/2005

OTHER PUBLICATIONS

Fitzek, Frank et al., "Authentication and Security in IP based Multi-Hop Networks" 7th WWRF Meeting in Eindhoven, The Netherlands Dec. 3-4, 2002, pp. 1-5.*

(Continued)

*Primary Examiner* — Michael Pyzocha
(74) *Attorney, Agent, or Firm* — Indira Saladi; Randi L. Karpinia; Kennett A. Haas

(57) ABSTRACT

A system and methods for providing a supplicant access to a communications network are disclosed. An authenticator receives an authentication request at an authenticator (210) from the supplicant. A state is created based on the authentication request at the authenticator (210). The authentication request is relayed towards a prime authenticator (215) where the prime authenticator is connected to an authentication server. Finally, the authenticator (215) receives authentication information from the prime authenticator and fulfills the authentication request using the authentication information.

8 Claims, 9 Drawing Sheets

(56) References Cited

OTHER PUBLICATIONS

IEEE 802.11i/D10.0, "Part 11: Wireless Medium Access Control (MAC) and Physical Layer (PHY) Specifications; Amendment 6: Medium Access Control (MAC) Security Enhancements," §§ 5.4.3.1; 7.2.3.10; 7.3.1.1; 7.3.1.2; 8.4.6; 8.5; 11.3, Apr. 2004, pp. 11; 26-27; 71-73; 76-109; 125-126.

PCT/US06/12910—PCT Search Report & Written Opinion—Mailed Mar. 28, 2008—8 pages.

KIPO—Office Action—KORS Preliminary Rejection—Issued Aug. 21, 2009—4 pages.

* cited by examiner

SYSTEM AND METHODS FOR PROVIDING MULTI-HOP ACCESS IN A COMMUNICATIONS NETWORK

FIELD OF INVENTION

The present invention relates to a system and method of providing a client access to a communications network through an authenticator in the communications network.

BACKGROUND OF THE INVENTION

The use of wireless communication devices has increased over the years. In present day communication networks, mobile devices such as PDAs, cellular phones and laptops need authentication before getting access to private databases or access to the Internet. Devices are authenticated through an Infrastructure Access Point (IAP), typically a base station, which is connected to an authentication server. The authentication request is transmitted using the Extensible authentication protocol (EAP) comprising of EAP over LAN (EAPOL) packets. The entire authentication process involves several EAPOL packets being transmitted and received, starting with an EAP Start packet and being completed with either an EAP Success message packet or an EAP Failure message packet. The authentication server stores the authentication credentials of the device (typically called a supplicant) that is being authenticated using the authentication server. Authentication servers can also be connected to other authentication servers to obtain authentication credentials of supplicants that are not stored locally.

In prior systems, a centralized approach is followed wherein a single IAP handles the authentication process of all supplicants within the range of the IAP. Since every supplicant can only be authenticated via the IAP, this method has several shortcomings. Prior systems which adhere to American National Standards Institute/Institute of Electrical and Electronics Engineers ANSI/IEEE 802.1X or ANSI/IEEE 802.11i standards utilize such a method. In such standards, the process of authentication of mobile devices is defined and the standards discuss a supplicant, an authenticator and an authentication server, where the authentication server authenticates a supplicant using an authenticator. The authentication server trusts the authenticator to forward correct authentication information received from the supplicant to the authentication server. However the authentication process as defined in the standards requires that the supplicant have a direct communication channel with the authenticator, and as such the standards do not support wireless multi-hop communications.

Since prior systems rely on a centralized approach and require a direct communication channel, there is a need for an improved system and method for providing multi-hop access.

BRIEF DESCRIPTION OF THE DIAGRAMS

The accompanying figures together with the detailed description below are incorporated in and form part of the specification, serve to further illustrate various embodiments and to explain various principles and advantages all in accordance with the present invention.

DETAILED DESCRIPTION

The present invention may be embodied in several forms and manners. The description provided below and the drawings show exemplary embodiments of the invention. Those of skill in the art will appreciate that the invention may be embodied in other forms and manners not shown below. The invention shall have the full scope of the claims and shall not be limited by the embodiments shown below. It is further understood that the use of relational term, if any, such as first, second, top and bottom, front and rear and the like are used solely for distinguishing one entity or action from another, without necessarily requiring or implying any such actual relationship or order between such entities or actions.

Figure 1:
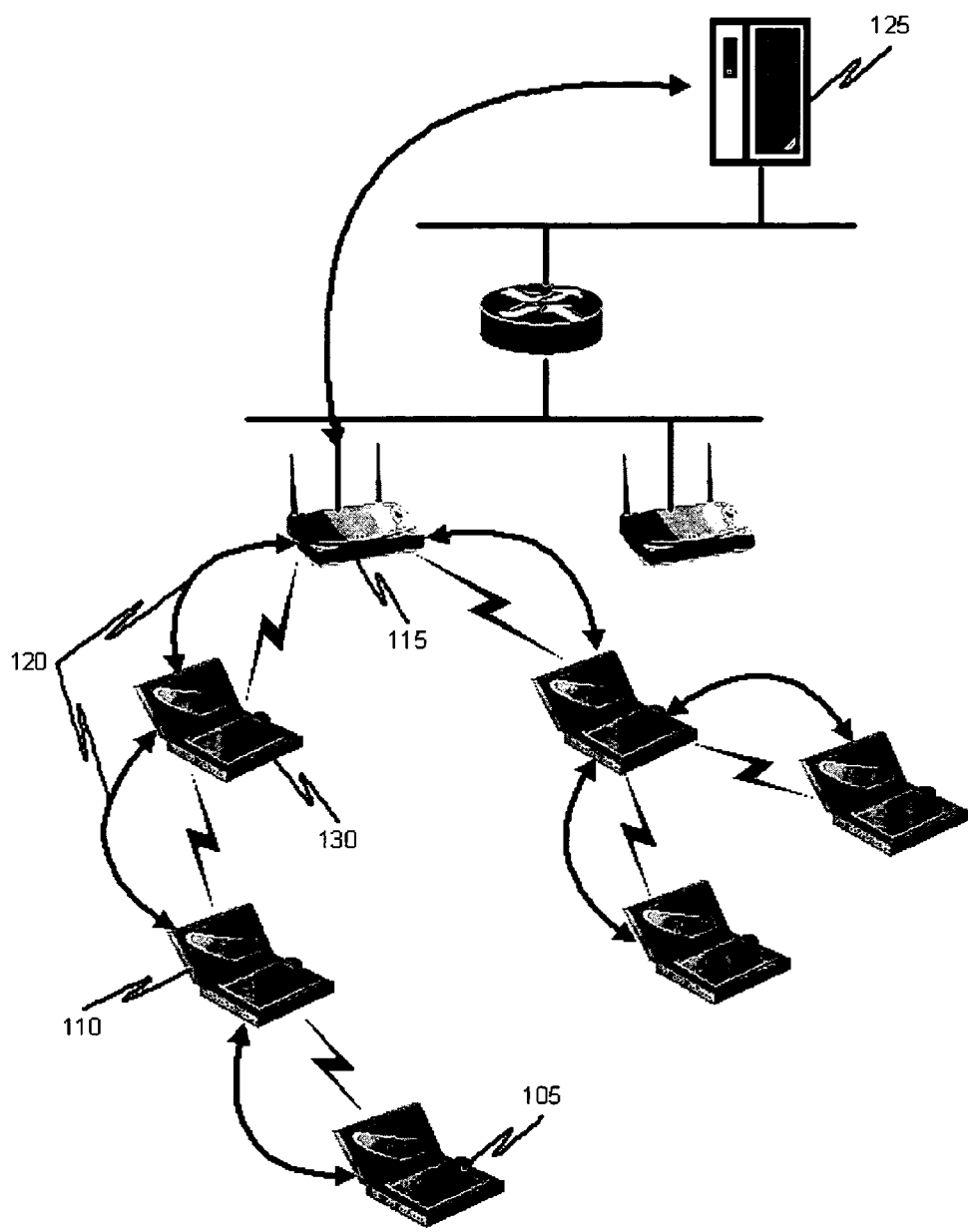
FIG. 1 is a first embodiment showing a distributed approach in a wireless communications network.

FIG. 1 illustrates a communications network comprising a supplicant 105, an authenticator 110, a prime authenticator 115, node 130 and an authentication server 125. The supplicant 105 sends an authentication request to the authenticator 110 where the authenticator forwards the authentication request towards a prime authenticator 115 by way of a relay. As used herein, the prime authenticator 115 is a fixed node that has a permanent security association with the authentication server 125. As used herein, the authenticator 110 is a supplicant that has already been authenticated indirectly by the prime authenticator 115 and thus is now termed an authenticator. Node 130 is authenticator 110's authenticator. As shown in FIG. 1, the supplicant 105 has an indirect security association with the authentication server 125 where indirect means that the supplicant 105's security association is via at least one other node. In this case, the supplicant 105 has an indirect security association via node 130 and the prime authenticator 115.

According to one embodiment, the supplicant 105 is authenticated via the authenticator 110 and once authenticated, is able to serve as an authenticator for other supplicants in the wireless communication network. As used herein, the authentication request is an authentication message transmitted from the supplicant 105 to the authenticator 110. As used herein, the direction of sending a message from the supplicant to the authenticator towards the prime authenticator is inbound; whereas, the direction of sending a message from the prime authenticator towards the authenticator and supplicant is outbound. As is known to one of ordinary skill in the art, the authentication request can be sent as a Remote Authentication Dial In User Service (RADIUS) message, as an extensible authentication packet over LAN (EAPOL) Start message, or as another similar authentication protocol. Those skilled in the art shall appreciate that there are several protocols and messaging technologies that can be used to send and receive authentication requests and such protocols and messaging technologies are within the scope of the present invention.

In any case, the authentication request contains information that indicates that the supplicant is attempting to authenticate with the authentication server. In the EAPOL embodiment, the authentication process occurs over several EAPOL messages, starting with an EAPOL Start or an EAP Request/Identity message and completing with an EAPOL Success message (in the event of a success in authenticating the supplicant) or an EAPOL Failure message (in the event of a failure in authenticating the supplicant). Further, every authenticator can be configured to create such authentication requests and forward the authentication requests to the prime authenticator 115. In any case, the authentication server stores the authentication credentials of the supplicant and uses the authentication credentials to validate the authentication request.

In one embodiment, the supplicant and the authenticators in the communication network are laptop computers. In such an embodiment, an Infrastructure Access Point ("IAP") serves as a prime authenticator for authenticating the laptop computers in conjunction with an alternate authentication server ("AAA server"). For example, a police network may provide access to police infrastructure to several laptops owned by the police department in a wireless communication network. In conventional systems, each laptop owned by the police department would be authenticated via the IAP that may also be owned by the police department. However the present invention provides a method whereby each laptop that has already been authenticated by the communication network can also serve as an authenticator. In one embodiment, an authenticator, e.g. a supplicant that has an indirect security relationship with the authentication server via the prime authenticator, sends out an advertisement where any new laptop wanting to get access to the police infrastructure services can be authenticated via the authenticator instead of being authenticated directly through the IAP. The method of authenticating the supplicant via another authenticator is done by means of a relay where the authentication request is relayed towards the prime authenticator via the authenticator. As used herein, the prime authenticator is a fixed node that has a permanent security relationship with the authentication server and all authentication requests are routed through the prime authenticator to reach the authentication server.

In one embodiment, the system further comprises at least one other node, e.g. node 130, between the authenticator 110 and the prime authenticator 115 where the node 130 functions to relay the authentication request to the prime authenticator 115. In such an embodiment, node 130 is an intermediate device known as an authentication relay. As an authentication relay, the node can also serve as an authenticator. That is, a node that has been authenticated can behave as both an authenticator and a relay based on the configuration. In essence, the node that has been authenticated can exhibit two behaviors through the node's relationship with another node. Those two behaviors are as an authenticator and as a relay. For example, the prime authenticator 115 is an authenticated node which has been authenticated to the authentication server 125. The relationship between the nodes is established through the inbound packets received from another node. First, an authenticated node knows that it is behaving as an authenticator to a supplicant node if the inbound packet is an EAPOL Start message where the EAPOL Start message has a transmitter address and a source address that are the same and/or the source address of the EAPOL Start message is in the authenticator's association table. In one embodiment, the authenticator's association table is updated when the authenticator receives an inbound or an outbound packet. In one embodiment, if a node behaves as an authenticator, it behaves according to ANSI/IEEE 802.11i's rules relating to authentication. Second, if the authenticated node receives an inbound EAPOL Start message from a node where the transmitter address is not equal to the source address and/or the source address of the EAPOL Start message is not in the authenticator's association table, the authenticated node knows that it needs to behave as a relay for that packet. Where the node behaves as a relay node, it updates the association table with the destination address, source address, transmitter address and receiver address for inbound and outbound EAPOL packets.

Once the authentication request reaches the prime authenticator 115, the prime authenticator 115 forwards the authentication request to the authentication server 125. In the EAPOL embodiment, the authentication process occurs over several EAPOL messages, starting with an EAPOL Start message or an EAP Request/Identity message and being completed with an EAPOL Success message (in the event of a success in authenticating the supplicant) or an EAPOL Failure message (in the event of a failure in authenticating the supplicant). Several packets comprising authentication information is relayed between the supplicant and the authentication server before the supplicant has been authenticated by the network. These packets comprise at least one of the packets described by the authentication processes defined authorized by ANSI/IEEE 802.1X.

The authentication information received from the authentication server 125 is sent to the prime authenticator 115. The prime authenticator 115 then uses the same relay process used while sending the authentication request to the authentication server 125 in reverse. The prime authenticator 115 relays the authentication information to node 130 which in turn relays the authentication information back to the authenticator 110. In the EAPOL embodiment, the authentication process is accomplished using several EAPOL messages that are relayed between the authentication server and the authenticator. The authenticator 110 then fulfills the authentication request using the authentication information.

As per one embodiment, the authentication information comprises a pairwise master key that is relayed from authentication server 125 back to the authenticator 110 by way of a relay. The pairwise master key is a unique key generated at the authentication server 125 corresponding to the supplicant 105, for each authentication. Each supplicant has a unique pairwise master key generated at the authentication server 125 corresponding to each supplicant, during each authentication. The unique key is relayed back to the authenticator 110 corresponding to the supplicant 105 and used to fulfill the authentication request of the supplicant 105.

Figure 2:
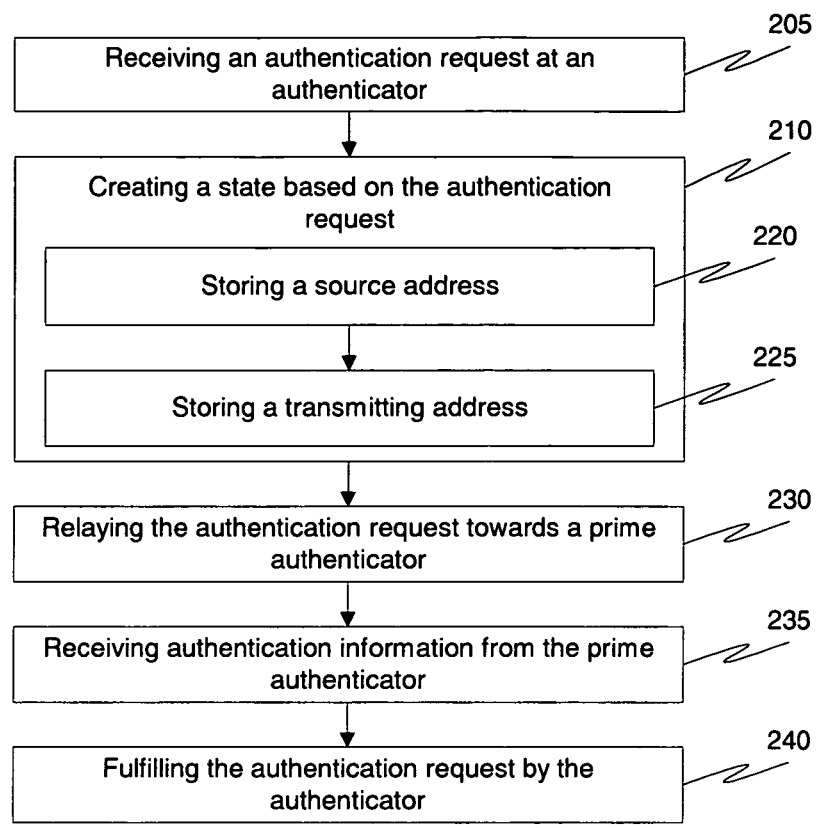
FIG. 2 is a second embodiment showing a flow chart of a method of providing access in a wireless communications network.

According to an embodiment disclosed in FIG. 2, a method for providing a supplicant access to a communications network comprises an authenticator first receiving an authentication request from a supplicant, step 205. Upon identifying the authenticator, the supplicant sends the authentication request to the authenticator. The authenticator creates a state on receiving the authentication request, step 210. The state comprises information including the source address, transmitting address, destination address, receiver address and other details pertaining to the supplicant and the authentication request, step 220, 225. The state is used to identify nodes in the relay chain to send the authentication information during the outbound relay process e.g. when the authentication information is relayed from the prime authenticator towards the authenticator. As per another embodiment, the authenticator can be connected to the prime authenticator via at an authentication relay and hence the authentication request would need to be relayed via an authentication relay to reach the prime authenticator, step 230. In this case, each authentication relay would create a state based on the authentication request. The prime authenticator relays authentication information to the authenticator, where the authenticator is an immediate node that sent the authentication request to the prime authenticator, step 232. The authentication information is generated at the authentication server based on the authentication request received from the supplicant. The prime authenticator receives the authentication request and forwards the authentication request to the authentication server.

The authentication server generates authentication information corresponding to the supplicant and sends the authentication information to the prime authenticator. The authentication information comprises a pairwise master key unique to the supplicant that is generated by the authentication server corresponding to the supplicant. The prime authenticator relays the authentication information back to the authenticator, step 235. The outbound relay process i.e. the relay from the prime authenticator towards the supplicant uses the state generated during the inbound relay process to identify the lower node to which the authentication information is to be sent. In one embodiment, where the authenticator is connected to the prime authenticator via at least one other authentication relay, the authentication information is relayed to the authenticator. The authenticator fulfills the authentication request using the pairwise master key received from the authentication server via the prime authenticator and authentication relay. In one embodiment, the authentication request is fulfilled using a four-way handshake process as specified in the ANSI/IEEE 802.1X standard. The result of a successful four-way handshake produces keys, at least one of which is used to encrypt/decrypt communications sent between the authenticator and supplicant. The system is capable of extending the function of the prime authenticator to other authenticated nodes in the wireless communications network by creating the state at each relay. The creation of the state at each authentication relay is further explained in with reference to FIG. 3.

Figure 3:
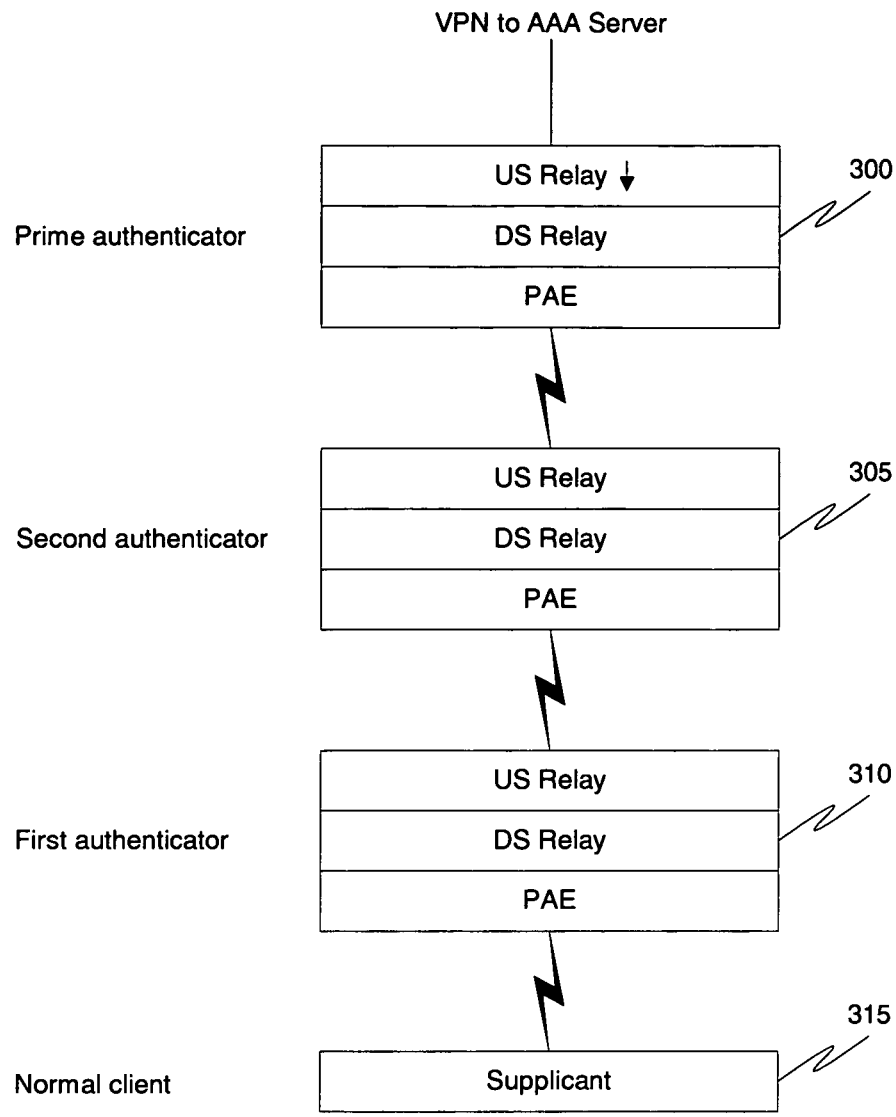
FIG. 3 illustrates a process of creating a state at each authentication node in a relay chain pursuant to an embodiment of the invention.

FIG. 3 shows a method by which authentication using a relay process is provided. As per one embodiment, a downstream relay is an inbound relay where nodes lower in the relay forward the authentication messages received from the supplicant 315 towards the prime authenticator 300. The supplicant, which is an ordinary client, sends the authentication messages to the first authenticator 310. An authenticator is a supplicant that has an indirect security relationship with the authentication server via the prime authenticator 300. As shown in FIG. 3, the first authenticator 310 has been authenticated via a second authenticator 305 and hence has a secure relationship to the authentication server via the second authenticator 305 and prime authenticator 300. The supplicant 315 first sends an authentication request to the first authenticator 310. The authentication request being relayed between the first authenticator 310 and the prime authenticator 300 can be done using various methods. As mentioned above, the authentication request can be sent as a Remote Authentication Dial In User Service (RADIUS) message, as an extensible authentication packet over LAN (EAPOL) Start message, or as another similar authentication protocol. As per the EAPOL embodiment, the authentication request involves the use of WDS frame formats incorporated within an EAPOL message. The WDS frames append the source address, the destination address, the transmitting address and the receiver address to the packet. The first authenticator 310 receives the authentication request such as an EAPOL Start message and creates a state. The state comprises information including the source address, the destination address, the transmitting address and the receiver address. In the embodiment shown in FIG. 3, the state generated by the first authenticator 310 includes the source address and the transmitting address as that of the supplicant. The EAPOL packet is then relayed to the next hop in the downstream relay chain. The second authenticator 305 receives the authentication request from the first authenticator 310. The second authenticator 305 also creates a state where the source address is that of the supplicant; however, the transmitting address is that of the first authenticator 310. As used herein, the state comprises one element of a state address pairing table, where the element pairs each source address with a transmitter address. The state establishes a relation where the second authenticator knows the node that sent the second authenticator 305 the authentication request of the supplicant. It can use this relation to relay the authentication information received from the authentication server via the prime authenticator to the supplicant. The authentication request reaches the prime authenticator 300 where the prime authenticator creates a state. The source address is the address of the supplicant and the transmitting address is that of the second authenticator 305. The authentication request is then forwarded to the authentication server for validation. As mentioned above, the prime authenticator 300 has a permanent security relationship with the authentication server using a virtual private network or similar such secure connection.

As used herein, an upstream relay is an outbound relay where the authentication information received from the authentication server is relayed back to the authenticator. As shown in FIG. 3, the prime authenticator 300 relays the authentication information received from the authentication server to the next hop, the second authenticator 305, using the state created in the inbound relay. As per the example described above, the second authenticator 305 receives the EAPOL packet from the prime authenticator 300 and creates additional state where the authentication information is stored. The authentication information comprises a unique pairwise master key corresponding to the supplicant, timers and other such information. The second authenticator 305 identifies the first authenticator as the node that relayed the authentication request in the inbound relay and therefore, relays the authentication information to the first authenticator 310. The second authenticator identifies which authenticator to send the authentication information to by first determining the destination address in the authentication information. Subsequently the second authenticator searches a state address pairing table. In one embodiment, the state address pairing table is created by inbound authentication requests. The second authenticator searches the state address pairing table for an element with a matching source address. Once this source address is found, the second authenticator finds the paired transmitter address which was initially extracted from the same inbound authentication request information. Having identified the source address and the transmitter address of the inbound authentication request in its state address pairing table, the second authenticator uses the source address as the destination address and the transmitter address as the receiver address for the outbound authentication information packet. Similarly, the first authenticator 310 receives the EAPOL packet from the second authenticator 305, creates additional state and identifies the supplicant as the next node in the relay. At this point, the authentication information comprising the pairwise master is not sent to the supplicant.

The first authenticator 310 uses this pairwise master key to authenticate the supplicant by way of a four-way handshake. The four-way handshake process uses a key generated by the supplicant 315 and the unique key received by the first authenticator 310 from the authentication server to authenticate the supplicant. However, those skilled in the art shall appreciate that other ways of creating such states to enable the relay process and identifying intermediate nodes through which the supplicant can establish a secure connection to the authentication server can also be used and these methods are within the scope of the present invention.

Figure 4:
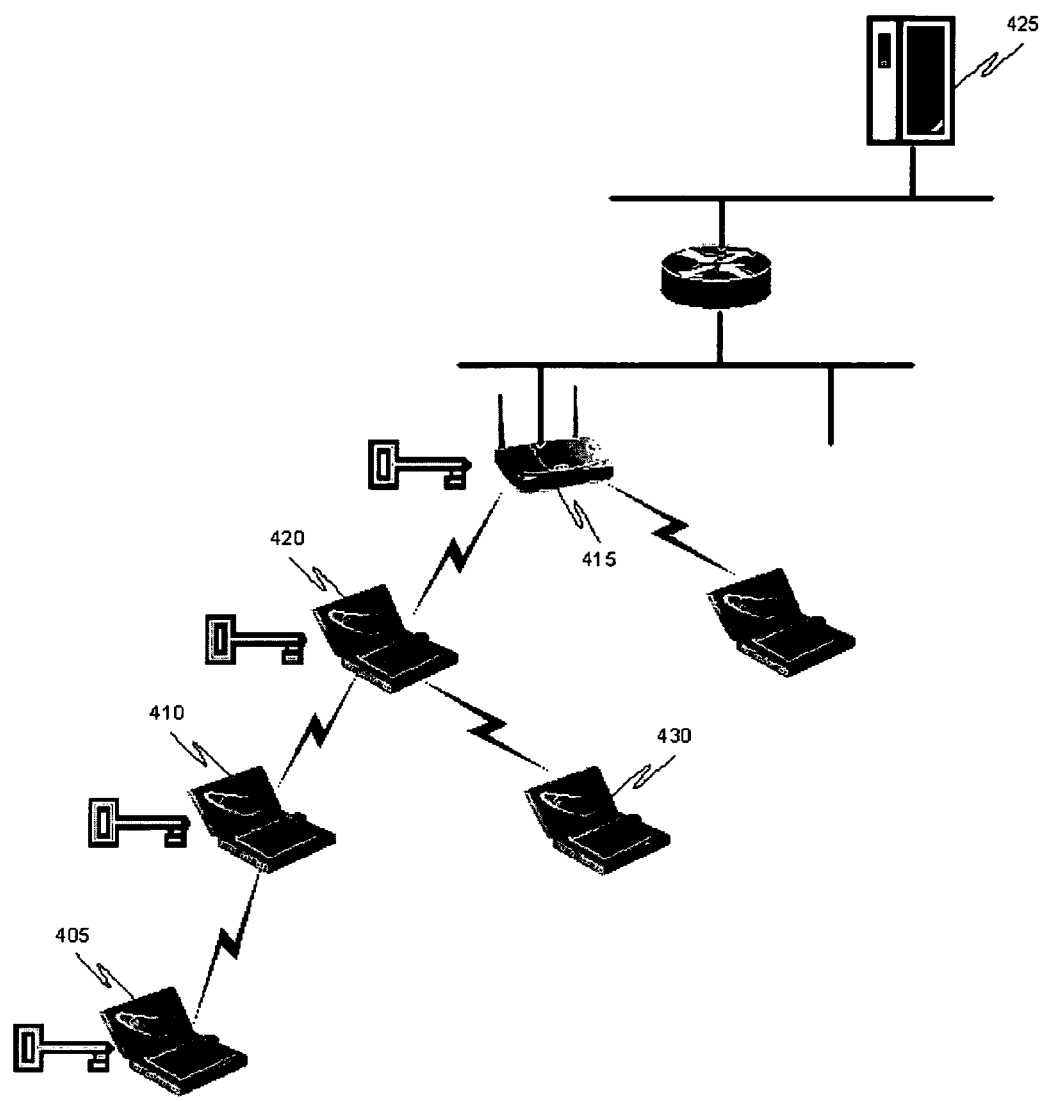
FIG. 4 shows a third embodiment for a method of providing mobility to a trusted supplicant, authenticated via an authenticator, in a wireless communications network
Figure 5:
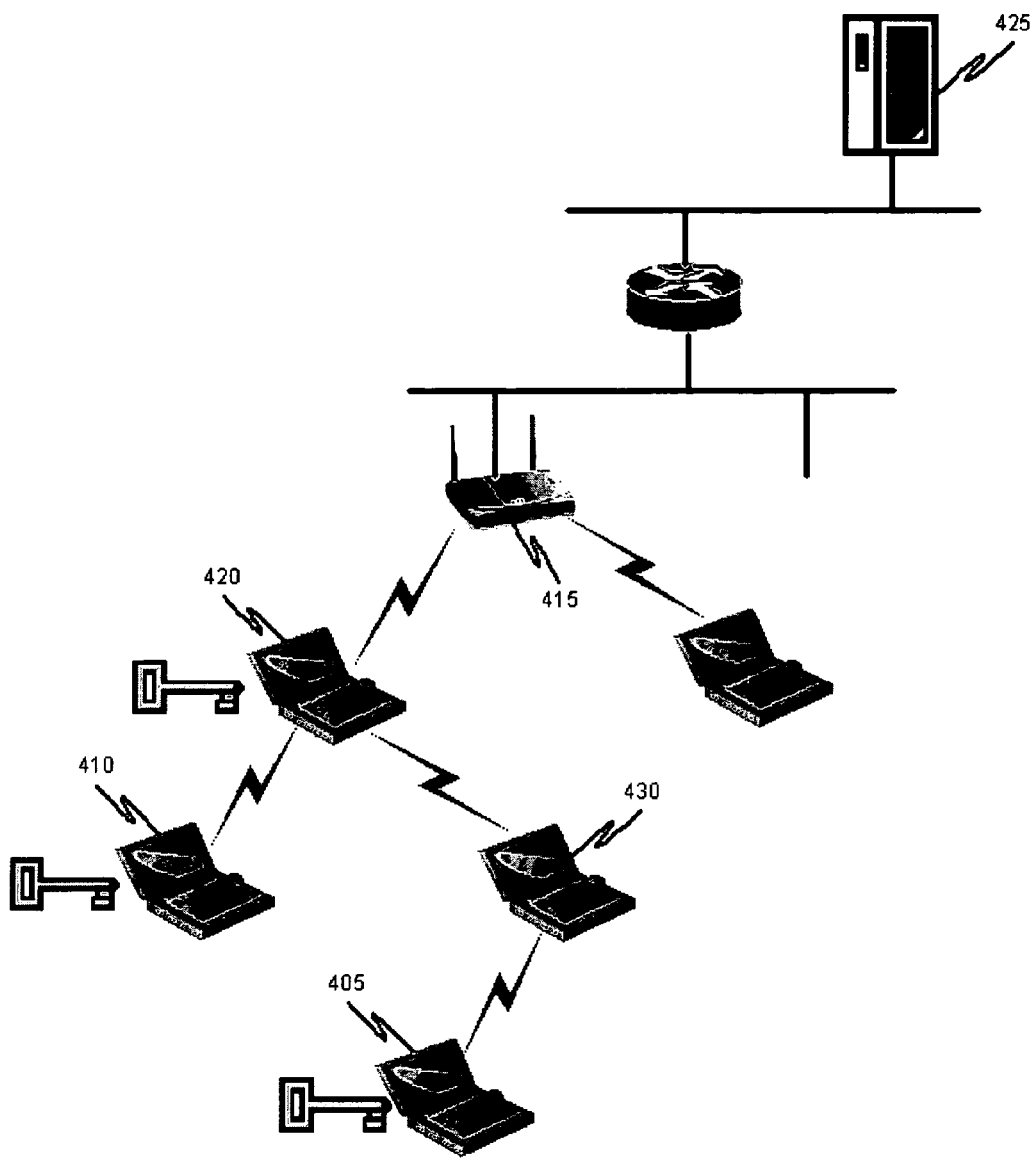
FIG. 5 shows the third embodiment wherein the trusted supplicant seeks authentication after connecting to a second authenticator.
Figure 6:
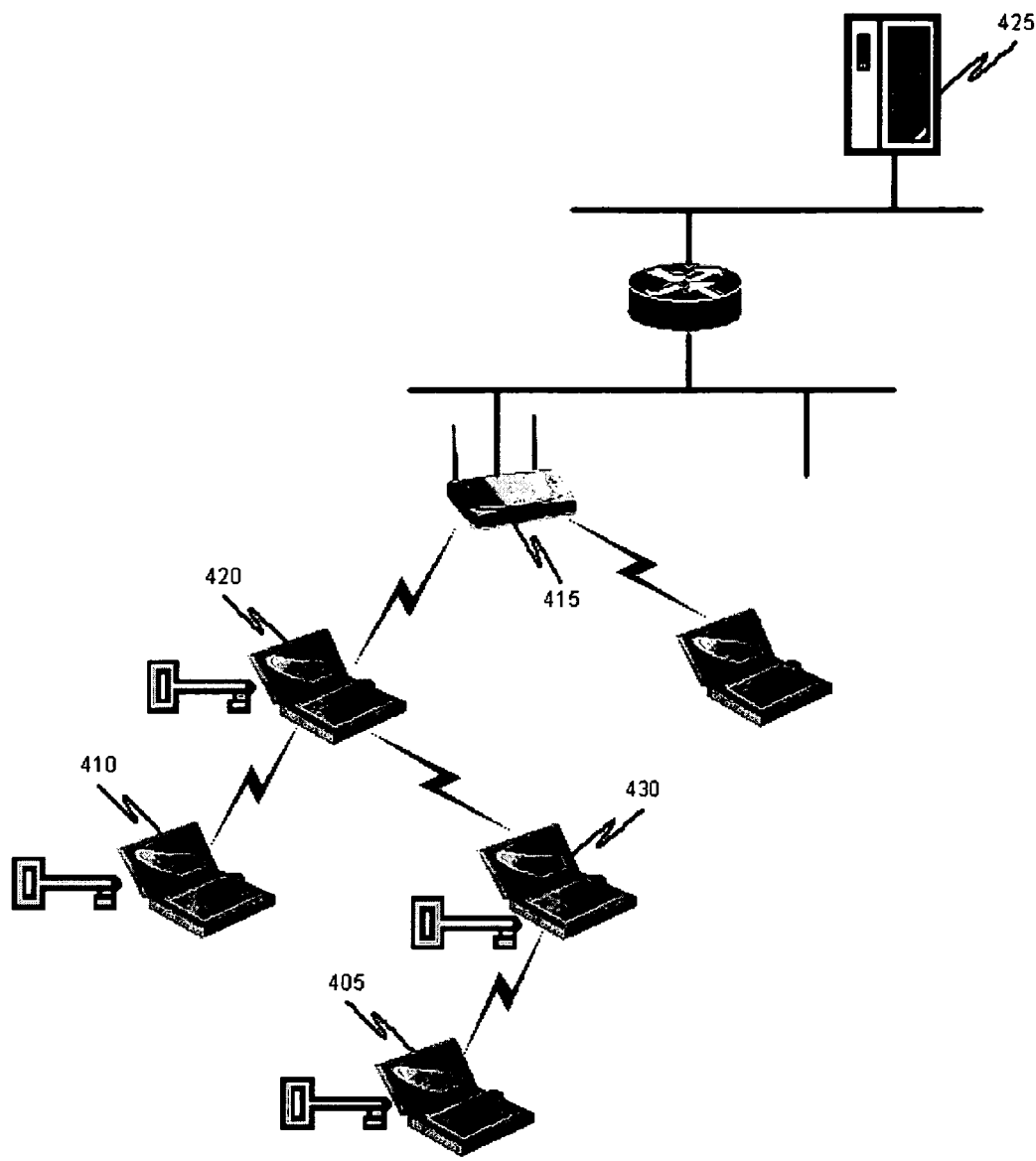
FIG. 6 shows the embodiment of FIG. 4 wherein the trusted supplicant becomes authenticated through the second authenticator.
Figure 9:
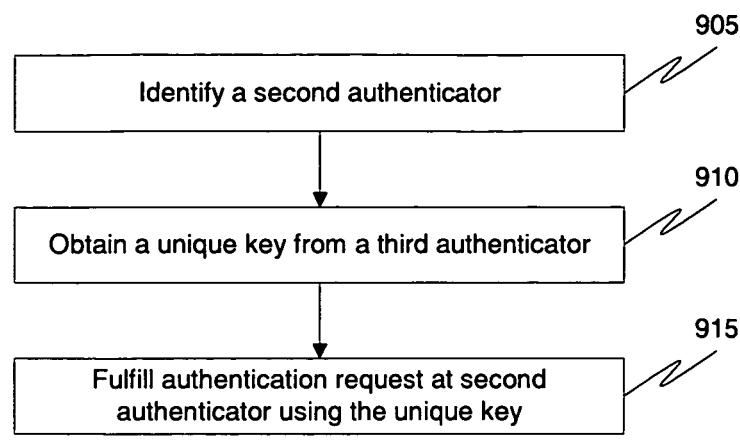
FIG. 9 is a flow chart of a method for providing mobility to a trusted supplicant described in the third embodiment.

FIGS. 4, 5, 6, 7 and 9, depict a method of providing mobility to a trusted supplicant 405 authenticated via a first authenticator in a wireless communications network pursuant to an embodiment of the present invention. In one embodiment, as shown in FIG. 4, a trusted supplicant 405 is a node that has an established secure association with the authentication server 425. The supplicant 405 is able to access the infrastructure or the database via the first authenticator 410. The authentication process disclosed above in previous embodiments is used to establish this secure connection. However, in the case where the first authenticator 410 disconnects from the communication network or the trusted supplicant 405 travels outside the range of the first authenticator 410, the trusted supplicant 405 needs to be re-authenticated via another trusted node in the communications network. As shown in FIGS. 4 and 9, the method includes first identifying a second authenticator 430 as per step 905, wherein the second authenticator 430 and the first authenticator 410 have a security association with the authentication server via a third authenticator 420 where the third authenticator has a secure relationship with the authentication server 425 via a prime authenticator 415. In one embodiment (not shown), there can be several other authenticators between the first authenticator 410 and the third authenticator 420, or the second authenticator 430 and the third authenticator 420 or the third authenticator 420 and the prime authenticator 415. An authenticator that is the first common node between the first authenticator 410 and second authenticator 430 serves as a node to provide authentication credentials to the second authenticator 430 to re-authenticate the supplicant 405. When the trusted supplicant 405 reattaches to the second authenticator 430, the trusted supplicant 405 still has its unique authentication key, but the second authenticator 430 does not, as shown in FIG. 5. As shown in FIG. 6, the trusted supplicant 405 initiates a full authentication process by transmitting an extensible application packet over LAN (EAPOL) start. The supplicant identifies the second authenticator 430 and sends an authentication request to the second authenticator 430. The second authenticator 430 relays this authentication request towards the prime authenticator. However, the third authenticator 420 receives the authentication request in the relay and identifies the supplicant. The third authenticator 420 relays the unique key corresponding to the trusted supplicant 405, as per step 910 back to the second authenticator. The third authenticator 420 identifies the supplicant based on the address of the supplicant 405 that had been previously stored by the third authenticator 420 during the authentication of the supplicant 405 by the first authenticator 410. When the trusted supplicant 405 is being re-authenticated via the second authenticator 430, the authentication request does not travel to the prime authenticator 415. The third authenticator 420 is able to forward the authentication information corresponding to the trusted supplicant 405 directly to the second authenticator 430. The second authenticator 430 obtains the unique key from the third authenticator 420 and authenticates the trusted supplicant 405 using the unique key as per step 915. The re-authentication process is completed by way of the four-way handshake between the second trusted node and the trusted supplicant. This process provides increased mobility to a supplicant in the wireless communications network.

Figure 7:
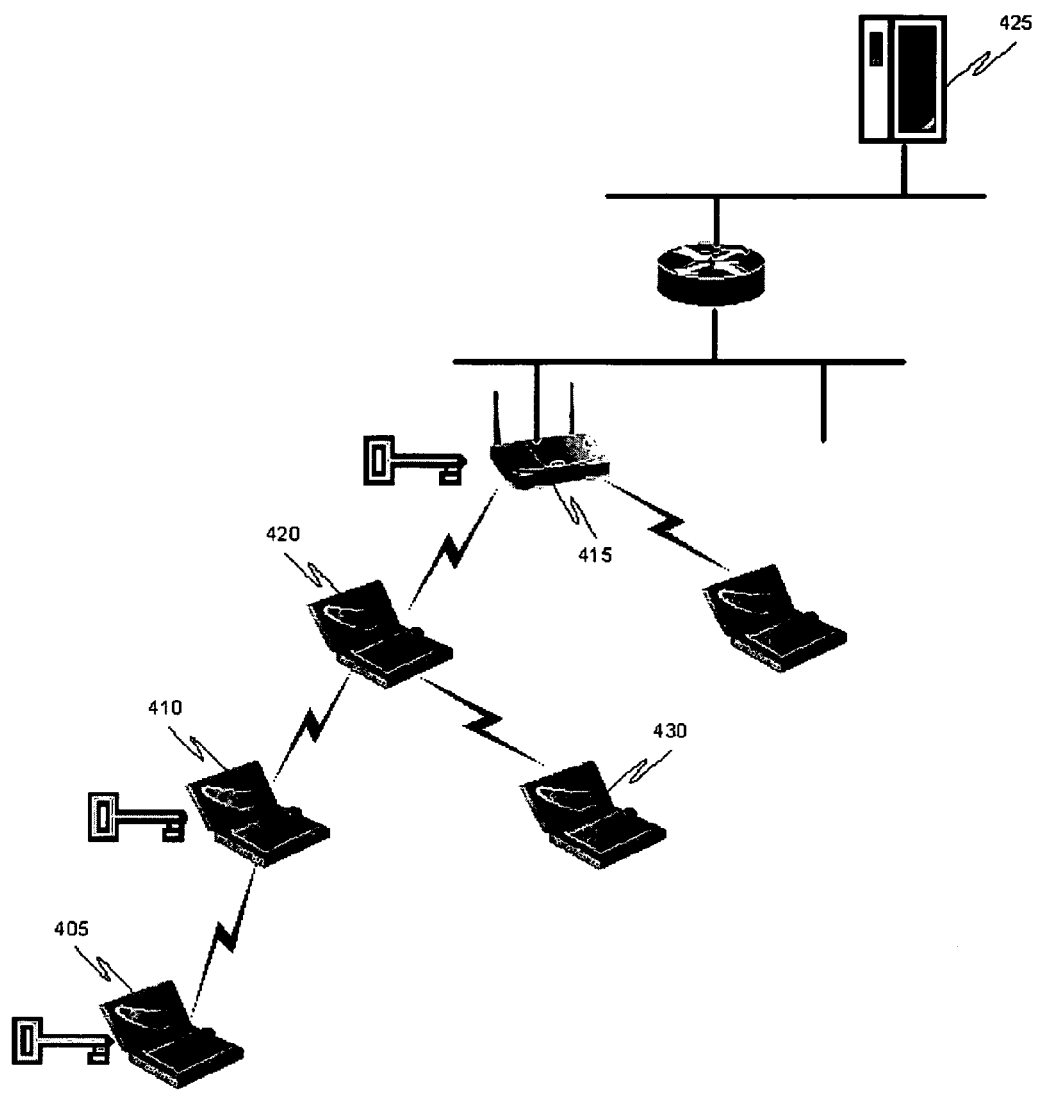
FIG. 7 shows an embodiment of FIG. 4 wherein a pairwise master key is stored at selected nodes.

According to another embodiment, as shown in FIG. 7, the nodes can be configured such that the pair wise master key relayed during the authentication is stored only at select authenticators to authenticate the supplicant. For example, the pairwise master key can be stored only at the prime authenticator 415 and the first authenticator 410 when the supplicant is being authenticated via the first authenticator 410. The pairwise master key is not stored at any of the intermediate authenticators such as 420. Not storing the pairwise master key at intermediate authenticators increases the security within the system. However, the supplicant is not provided with the increased mobility provided in a previous embodiment. In the case where the authentication credentials are stored only at the first authenticator 410 and the prime authenticator 415, the authentication request would need to be relayed to the prime authenticator 415 to obtain the authentication credentials i.e. the unique pairwise master key instead of the previous embodiment where the third authenticator 420 is able to relay the authentication information to the second authenticator 430. The unique key is relayed to the second authenticator 430 and then used to complete the authentication process using a four-way handshake. However, this embodiment still prevents the need to contact the authentication server 425 again to obtain the authentication information pertaining to the trusted supplicant 405. The delay caused due to the process of contacting the authentication server 425 is avoided and the prime authenticator 415 can relay the authentication credentials created at the time of authenticating the supplicant via the first authenticator 410, directly to the second authenticator 430 for re-authentication.

Figure 8:
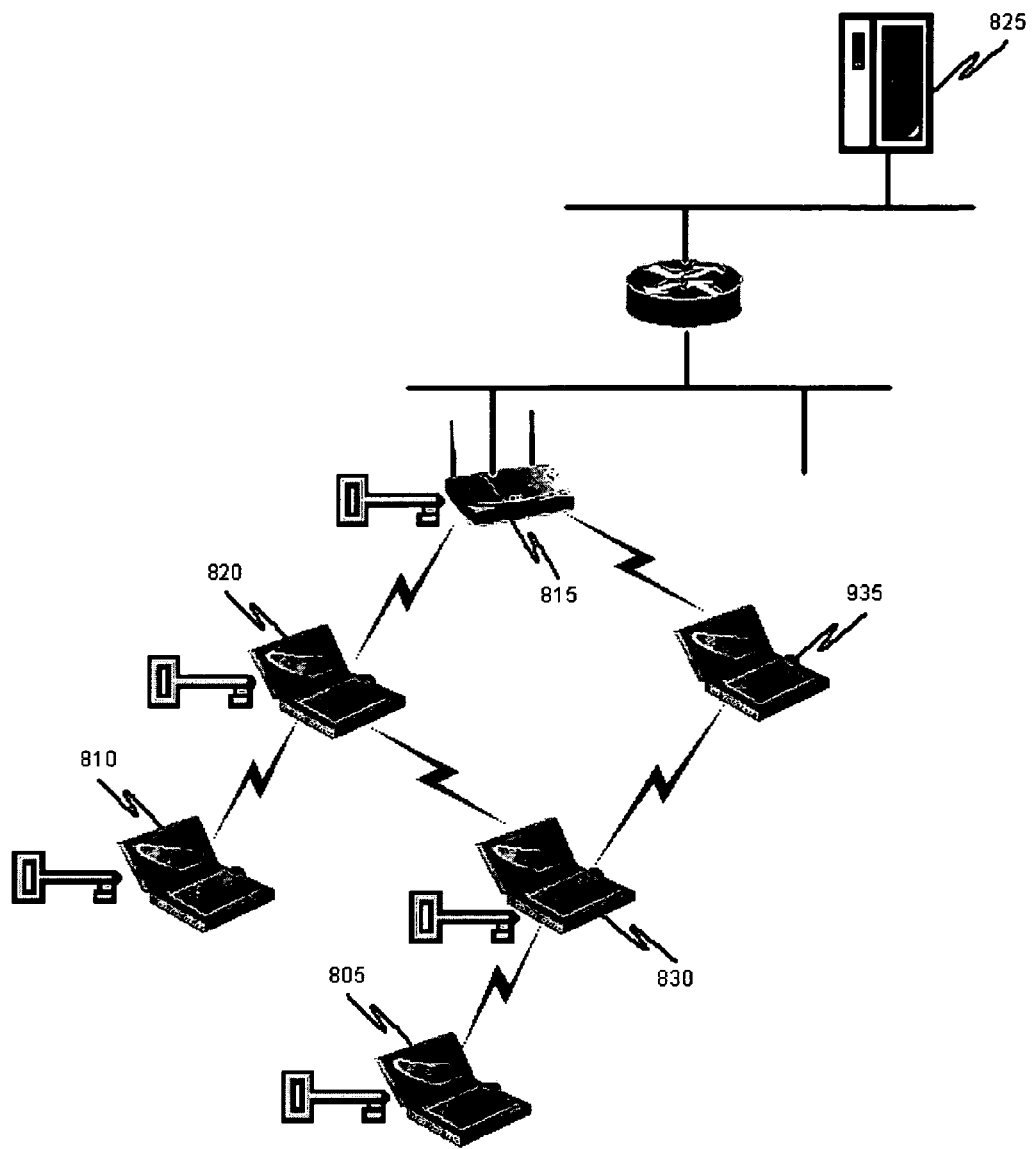
FIG. 8 shows another method pursuant to an embodiment of the present invention.

Pursuant to one embodiment shown in FIG. 8, the pair wise master key is stored at selected authenticators. An authenticator node 935 can work in one of two modes, depending on the configuration. The authenticator 935 can allow traffic that authenticator 830 allows or force all authenticators below authenticators 830 to re-authenticate or all authenticators below and including 830 to reauthenticate.

This disclosure is intended to explain how to fashion and use various embodiments in accordance with the invention rather than to limit the true, intended and fair scope and spirit thereof. The foregoing discussion is not intended to be exhaustive or to limit the invention to the precise forms disclosed. Modifications or variations are possible in the light of the above teachings. The embodiment(s) was chosen and described to provide the best illustration of the principles of the invention and practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

What is claimed is:

1. A system for providing multi-hop access to a supplicant in a wireless communications network, the system comprising:
   a supplicant identifying an authenticator and seeking authentication by sending an authentication request to the authenticator via said wireless communications network;

the authenticator to receive the authentication request from the supplicant, the authenticator creating a state on receiving the authentication request and determining if the authenticator will authenticate the supplicant based on a transmitter address included within the authentication request and a source address included within the authentication request;

a prime authenticator to receive the authentication request by way of a relay from the authenticator;

an authentication server connected to the prime authenticator to receive the authentication request from the authenticator;

the authentication server to generate an authentication information in response to the authentication request and to relay the authentication information via the prime authenticator to the authenticator; and the authenticator to authenticate the supplicant using the authentication information by way of a four-way handshake, wherein the authenticator is in an indirect security relationship with the authentication server via the prime authenticator.

2. The system of claim 1 wherein the system adheres to an ANSI/IEEE 802.11 standard.

3. The system of claim 1 wherein the authentication request is described by the authentication processes in an ANSI/IEEE 802.1X standard.

4. The system of claim 3, wherein the authenticator is connected to the prime authenticator via at least one other authenticator.

5. The system of claim 1, wherein the authenticator creates an additional state upon receiving the authentication information.

6. The system of claim 1, wherein the authentication information comprises a pairwise master key.

7. The system of claim 1 wherein the supplicant upon becoming authenticated becomes an authenticator.

8. The system of claim 1 wherein the supplicant receives a new authentication request from a new node after being authenticated by the authenticator and wherein the supplicant determines if the supplicant will authenticate the new node for infrastructure access of the new node by comparing a transmitter address included within the new authentication request and a source address included within the new authentication request.

* * * * *

UNITED STATES PATENT AND TRADEMARK OFFICE
CERTIFICATE OF CORRECTION

| | | |
|---|---|---|
| PATENT NO. | : 8,850,194 B2 | Page 1 of 1 |
| APPLICATION NO. | : 11/108999 | |
| DATED | : September 30, 2014 | |
| INVENTOR(S) | : Anthony R. Metke et al. | |

It is certified that error appears in the above-identified patent and that said Letters Patent is hereby corrected as shown below:

TITLE PAGE:

Item (57), under "ABSTRACT", in Column 2, Line 3, delete "authenticator (210)" and insert -- authenticator (205) --, therefor.

Item (57), under "ABSTRACT", in Column 2, Line 6, delete "authenticator (215)" and insert -- authenticator (230) --, therefor.

Item (57), under "ABSTRACT", in Column 2, Line 8, delete "authenticator (215)" and insert -- authenticator (235) --, therefor.

IN THE SPECIFICATION:

In Column 2, Line 6, delete "network" and insert -- network. --, therefor.

Signed and Sealed this
Twenty-fourth Day of May, 2016

Michelle K. Lee
*Director of the United States Patent and Trademark Office*